United States Patent

Miyaji et al.

[11] Patent Number: 6,108,380
[45] Date of Patent: *Aug. 22, 2000

[54] METHOD AND APPARATUS FOR DECIDING OPTIMUM ORTHOGONAL TRANSFORM MODE

[75] Inventors: Satoshi Miyaji; Shuichi Matsumoto, both of Tokyo, Japan

[73] Assignee: Kokusai Denshin Denwa Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/958,040

[22] Filed: Oct. 27, 1997

[30] Foreign Application Priority Data

Oct. 29, 1996 [JP] Japan ..................... 8-302364

[51] Int. Cl.[7] .............. H04B 1/66; H04N 7/12
[52] U.S. Cl. .............. 375/240; 348/403; 348/412
[58] Field of Search ................... 348/403, 412, 348/401, 402, 405, 408, 420, 413, 414, 415; 375/200, 240; H04B 1/66; H04N 7/12

[56] References Cited

U.S. PATENT DOCUMENTS

| | | | |
|---|---|---|---|
| 4,851,906 | 7/1989 | Koga et al. | 348/413 |
| 5,214,507 | 5/1993 | Aravind et al. | 348/415 |
| 5,450,453 | 9/1995 | Frank | 375/200 |
| 5,539,466 | 7/1996 | Igarashi et al. | 348/401 |
| 5,559,931 | 9/1996 | Shindou et al. | 395/105 |
| 5,657,086 | 8/1997 | Tahara et al. | 348/412 |
| 5,666,461 | 9/1997 | Igarashi et al. | 348/402 |
| 5,737,020 | 4/1998 | Hall et al. | 348/403 |

*Primary Examiner*—Chris S. Kelley
*Assistant Examiner*—Gims S. Philippe
*Attorney, Agent, or Firm*—Arent Fox Kintner Plotkin & Kahn

[57] ABSTRACT

When a selective decision of the field mode/frame mode for orthogonal transform is made for each macroblock composed of a plurality of blocks in a motion picture coding system wherein coding of an interlaced TV signal proceeds in the frame structure and an orthogonal transform is made in the unit of a block, the respective variances of the blocks within the macroblock are calculated, the calculated results are substituted respectively into an monotonously increasing and saturation tending nonlinear function to evaluate the sum of these functional values, and such a decision is made as to select the smaller mode in sum.

10 Claims, 3 Drawing Sheets

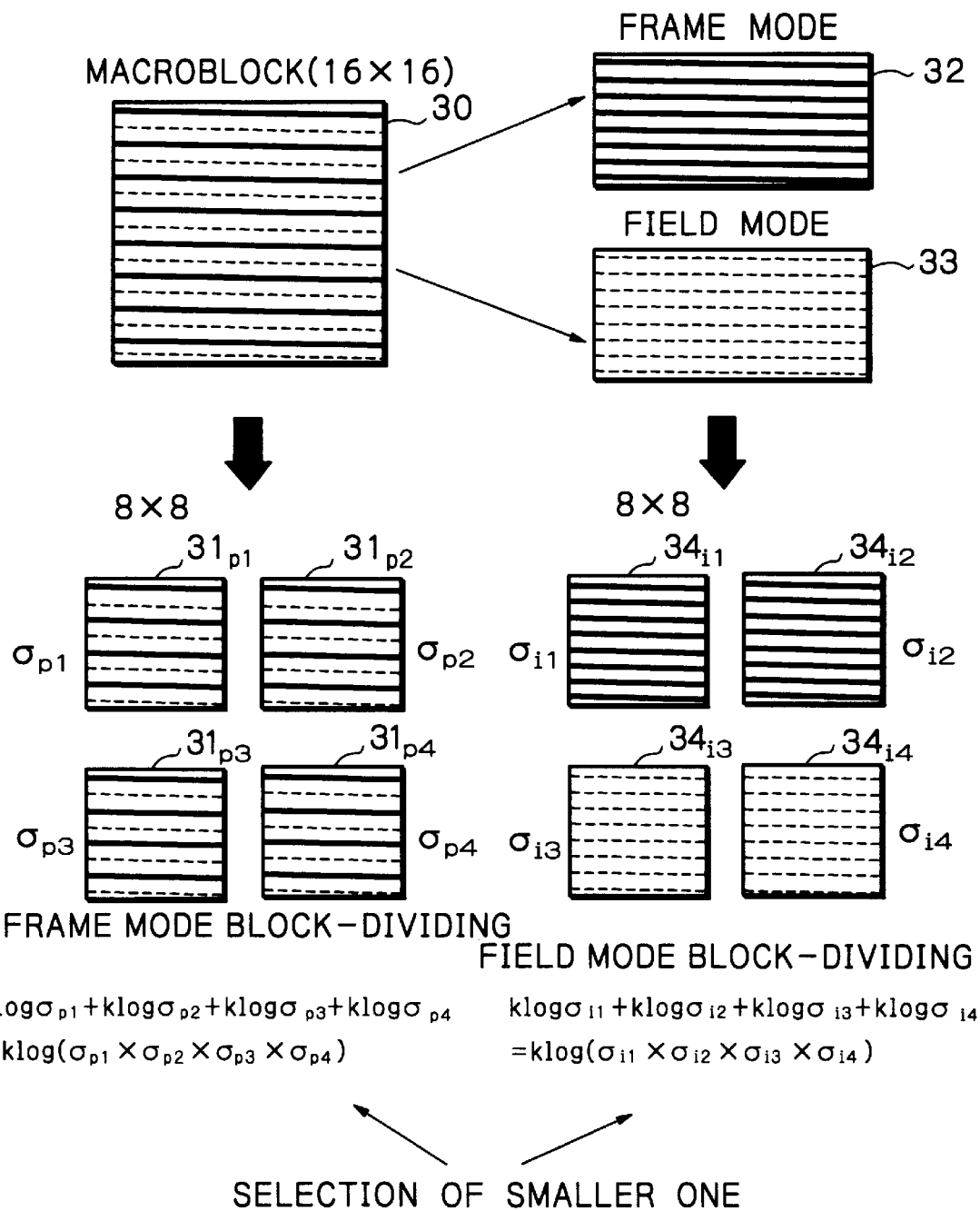

METHOD AND APPARATUS FOR DECIDING OPTIMUM ORTHOGONAL TRANSFORM MODE

FIELD OF THE INVENTION

The present invention relates to a method and apparatus for deciding optimum orthogonal transform mode in a high efficiency motion picture coding system, in which interlaced TV signals are orthogonally transformed in the unit of a block.

DESCRIPTION OF THE RELATED ART

Many of the conventional methods for coding interlaced TV signals have orthogonally transformed the signals by using the frame mode without mode decision of orthogonal transform, after transforming the interlaced TV signals into a frame structure by the field merge.

With respect to pictures without rapid motion, the frame mode has a higher vertical correlation of pixel values than the field mode because the distance between pixels becomes closer. Thus, an orthogonal transform is carried out with a higher efficiency in the frame mode. In contrast to this, with respect to pictures with rapid motion, the frame mode has a lower vertical correlation of pixel values than the field mode because the picture information largely differs between two sequential fields when frame merging. Thus, in the latter case, it is better to execute the orthogonal transform in the field mode for expecting a higher efficiency.

As will be understood from the above description, if an orthogonal transform is performed in a fixed mode or either field mode or frame mode, the efficiency of orthogonal transform greatly decreases especially for a picture with rapid motion, thus possibly leading to a great decrease in picture quality.

A mode selection system is known as it selects either the frame mode or the field mode depending upon the current picture without fixing the mode. In this known mode selection system, the respective differential values of motion compensation pixels are calculated in the frame and field modes for each macroblock and the mode providing the smaller absolute value sum or mean square value is selected.

According to this known mode selection system, however, since the sum of differential pixel values are used for determination of selection, the complexity of differential pictures may not be considered. In case of a large differential value, this mode selection system certainly detects that the amount of generated information is large. However, even for a large differential value, the actual amount of the generated information after the orthogonal transform may decrease under the condition that the change is relatively gradual. Thus, in this case, an erroneous detection may take place according to the known mode selection system.

Furthermore, according to this mode selection system, since the sum of differential pixel values is calculated for each macroblock, no account is made of the local characteristics within a macroblock. Accordingly, although the amount of the generated information as a whole macroblock is not so great, an extremely large differential value in the macroblock might lead to an erroneous mode decision under influence of the local greatness.

In the test model 5 (TM5) of MPEG-2, an orthogonal transform mode decision is also executed. This decision is accomplished by dividing a frame-merged macroblock of 16 pixels×16 lines into two subblocks of 16 pixels×8 lines having components of even lines and odd lines, and deciding an execution in the frame mode if the correlation coefficient of pixel values between the above two blocks is greater than 0.5, or otherwise in the field mode.

In this mode decision system, however, since no comparison whatever is made of the information amount in possession of both modes and moreover no theoretical ground for a value of 0.5 is clarified, the optimum mode decision cannot be expected.

SUMMARY OF THE INVENTION

It is therefore an object of the present invention to provide a method and apparatus for deciding optimum orthogonal transform mode capable of a more effective coding.

The present invention relates to a motion picture coding system in which coding of interlaced TV signals proceeds in a frame structure and an orthogonal transform is made in the unit of a block. According to the present invention, when a selective decision of the field mode/frame mode in orthogonal transform is made for each macroblock consisting of a plurality of blocks, variances of blocks in the macroblock are calculated, the calculated results are substituted respectively into a nonlinear function as increases monotonously and tends to be saturated, the sum of those functional values are evaluated and such a decision is made to select the mode giving the smaller sum.

To subject an orthogonal transform to each macroblock in a field-merged picture of a frame structure, further dividing this macroblock into subblocks is performed. In the frame mode, a macroblock is simply divided, whereas a macroblock is divided according to even and odd lines and the respective even and odd fields are divided in the field mode. However, a macroblock in this case may be of an original picture (Intra coding) or of a differential picture with its motion compensated picture (Inter coding).

Thus, for each macroblock, the frame mode or the field mode with smaller entropy is selected. Since the entropy in one picture is proportional to the logarithm of the variance of pixels, the entropy of a macroblock can be indirectly represented from the variance.

Particularly in the present invention, variances are calculated for all individual subblocks in a macroblock so as to take the local characteristics within the macroblock into consideration. Furthermore, since individual variances in the macroblock are substituted into a nonlinear function which increases monotonously and tends to saturate and are totaled to make a selective decision in accordance with the evaluated sum, an accurate decision can be expected without being affected, even if a part has an extremely large value in variance.

To be more specific, according to the present invention, a method for deciding an optimum orthogonal transform mode in a motion picture coding system in which coding of interlaced TV signals proceeds in a frame structure and an orthogonal transform such as, for example DCT (Discrete Cosine Transform) is made in the unit of a macroblock, includes a step of dividing a macroblock into a plurality of frame mode blocks, a step of dividing the macroblock into a plurality of field mode blocks, a step of calculating variances of the respective frame mode blocks, a step of calculating variances of the respective field mode blocks, a step of calculating the sum of values of a monotonously increasing and substantially saturating nonlinear function using the calculated variances of frame mode blocks as a variable, a step of calculating the sum of values of a monotonously increasing and substantially saturating nonlinear function using the calculated variances of field mode blocks as a variable, and a step of comparing the sum calculated concerning the frame mode blocks with the calculated one concerning the field mode blocks to select one of the modes which is smaller in sum as the orthogonal transform mode, i.e., to select the frame mode if the sum concerning the frame mode blocks is smaller or otherwise to select the field mode.

Besides, according to the present invention, a method for deciding an optimum orthogonal transform mode in a motion picture coding system in which coding of interlaced TV signals proceeds in the frame structure and an orthogonal transform such as for example DCT is made in the unit of a macroblock, includes a step of dividing a macroblock into a plurality of frame mode blocks, a step of dividing the macroblock into a plurality of field mode blocks, a step of calculating variances of the respective frame mode blocks, a step of calculating variances of the respective field mode blocks, a step of calculating the multiplicative value by multiplying the calculated variances of frame mode blocks, a step of calculating the multiplicative value by multiplying the calculated variances of field mode blocks, and a step of comparing the multiplicative value calculated concerning the frame mode blocks with the calculated one concerning the field mode blocks to select one of the modes which is smaller in multiplicative value as the orthogonal transform mode, i.e., to select the frame mode if the value concerning the frame mode blocks is smaller or otherwise to select the field mode.

Furthermore, according to the present invention, an apparatus for deciding an optimum orthogonal transform mode in a motion picture coding system in which coding of interlaced TV signals proceeds in the frame structure and an orthogonal transform such as for example DCT is made in the unit of a macroblock, includes a unit for dividing a macroblock into a plurality of field mode blocks, a unit for dividing the macroblock into a plurality of frame mode blocks, a unit for calculating variances of the respective frame mode blocks, a unit for calculating variances of the respective field mode blocks, a unit for calculating the sum of values of a monotonously increasing and substantially saturating nonlinear function using the calculated variances of frame mode blocks as a variable, a unit for calculating the sum of values of a monotonously increasing and substantially saturating nonlinear function using the calculated variances of field mode blocks as a variable, and a unit for comparing the sum calculated concerning the frame mode blocks with the calculated one concerning the field mode blocks to select one of the modes which is smaller in sum as the orthogonal transform mode, i.e., to select the frame mode if the sum concerning the frame mode blocks is smaller or otherwise to select the field mode.

Still further, according to the present invention, an apparatus for deciding an optimum orthogonal transform mode in a motion picture coding system in which coding of interlaced TV signals proceeds in the frame structure and an orthogonal transform such as for example DCT is made in the unit of a macroblock, includes a unit for dividing a macroblock into a plurality of frame mode blocks, a unit for dividing the macroblock into a plurality of field mode blocks, a unit for calculating variances of the respective frame mode blocks, a unit for calculating variances of the respective field mode blocks, a unit for calculating the multiplicative value by multiplying the calculated variances of frame mode blocks, a unit for calculating the multiplicative value by multiplying the calculated variances of field mode blocks, and a unit for comparing the multiplicative value calculated concerning the frame mode blocks with the calculated one concerning the field mode blocks to select one of the modes which is smaller in multiplicative value as the orthogonal transform mode, i.e., to select the frame mode if the value concerning the frame mode blocks is smaller or otherwise to select the field mode.

As for the nonlinear function mentioned above, any function that monotonously increases and tends to saturate such as exponential, square root or hyperbolic function can be used.

Further objects and advantages of the present invention will be apparent from the following description of the preferred embodiments of the invention as illustrated in the accompanying drawings.

BRIEF DESCRIPTION OF THE DRAWINGS

FIG. 3 is an illustration of a mode decision mechanism by the optimum mode decision DCT unit of FIG. 2.

DESCRIPTION OF THE PREFERRED EMBODIMENTS

Figure 1:
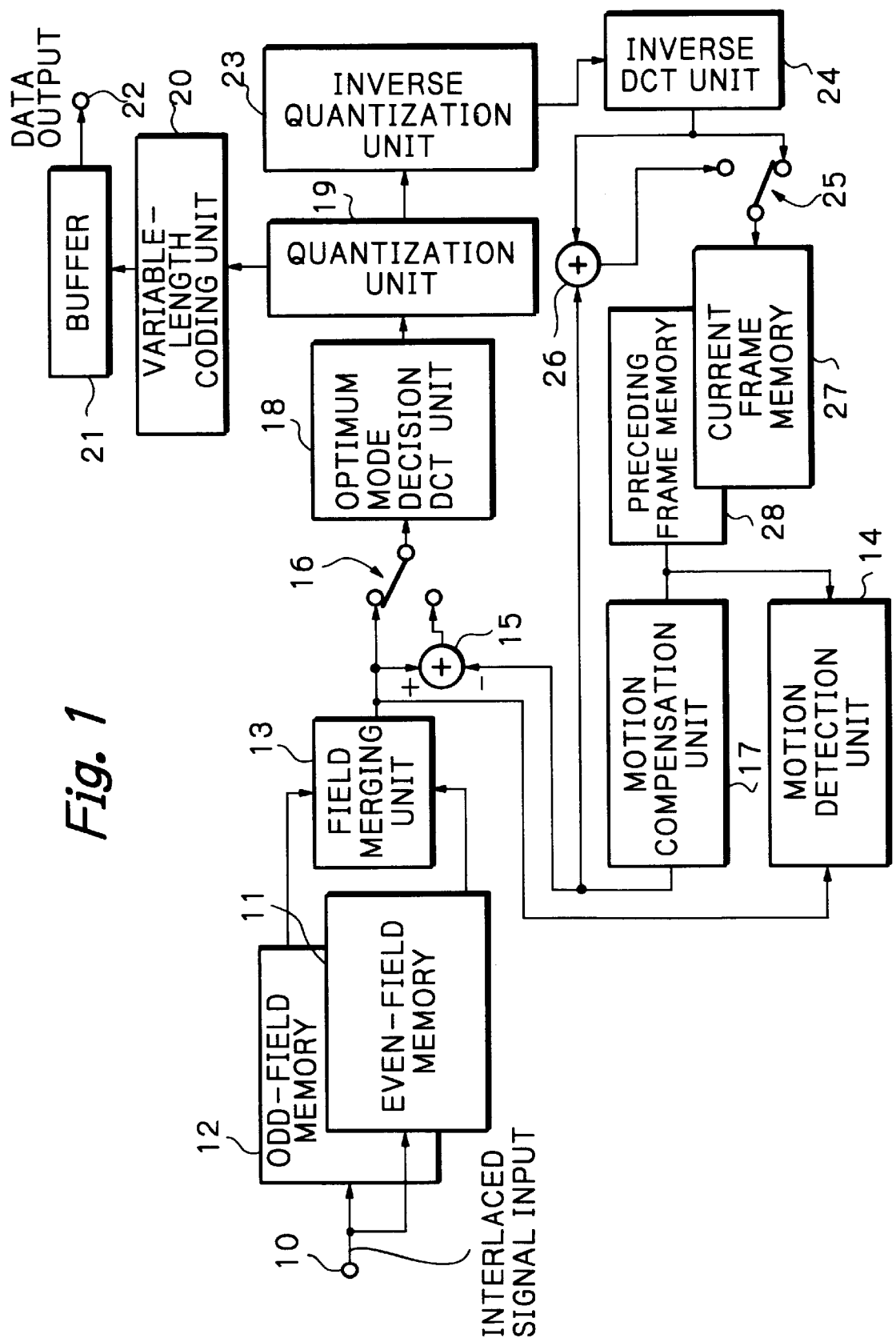
FIG. 1 is a schematic block diagram of a motion picture coding apparatus according to a preferred embodiment of the invention.

In FIG. 1 schematically showing the configuration of a motion picture coding apparatus as a preferred embodiment of the present invention, reference numeral 10 denotes an interlaced signal input unit, 11 and 12 denote an even-field memory and an odd-field memory connected to the interlaced signal input unit 10 for storing the input even-field and odd-field picture signals respectively, and 13 denotes a field merge unit for synthesizing the interlaced TV signals of the even fields and odd fields to output a macroblock (16 pixels×16 lines) of a frame structure, respectively.

Connected to the field merge unit 13 are a motion detection unit 14, an adder 15 for performing a subtraction to obtain differential picture between the original picture and the motion compensated picture and a selection switch 16. Connected to the other input terminal of the adder 15 is the output terminal of the motion compensation unit 17. Connected to the selection switch 16 is the output terminal of the adder 15. The selection switch 16 selects whether to perform encoding by using the original picture (Intra coding) or by using differential picture with the motion compensated picture (Inter coding).

The output terminal of the selection switch 16 is connected to an optimum mode decision DCT unit 18 for deciding an optimum mode and for processing the orthogonal transform (DCT). The output terminal of the optimum mode decision DCT unit 18 is connected via a quantization unit 19 to a variable-length coding unit 20 for the Haffmann encoding or Ranglength encoding and further connected via a buffer 21 to a data output unit 22. Thereby, DCT coefficient data obtained by the orthogonal transform processing are quantized, variable-length encoded and outputted as coded data from the data output unit 22.

The quantization unit 19 is connected via an inverse quantization unit 23 for the inverse quantization to an inverse DCT unit 24 for the inverse DCT processing. The output terminal of the inverse DCT unit 24 is connected to a selection switch 25 and an adder 26. Connected to the other input terminal of the adder 26 is the motion compensation unit 17. Depending upon whether the coding processing is executed based upon the intra picture or the inter picture with the motion compensated picture, the selection switch 25 which co-operates with the selection switch 16, selectively supplies the output of either the inverse DCT unit 24 or the adder 26 to a current frame memory 27 connected to the output terminal thereof. A preceding frame memory 28 stores the picture data of the preceding frame which has been stored in the current frame memory 27. Connected to the preceding frame memory 28 are the motion detection unit 14 and the motion compensation unit 17. The motion in the picture between frames is detected at the motion detection unit 14, and the macroblock of the preceding frame, which is motion compensated by the detected motion vector at the motion compensation unit 17, is input to the adder 15 mentioned above.

Since the configuration and the operation of the coding apparatus shown in FIG. 1 except for the optimum mode decision DCT unit 18 are well known in this field, the optimum mode decision DCT unit 18 alone will hereinafter be described in detail.

Figure 2:
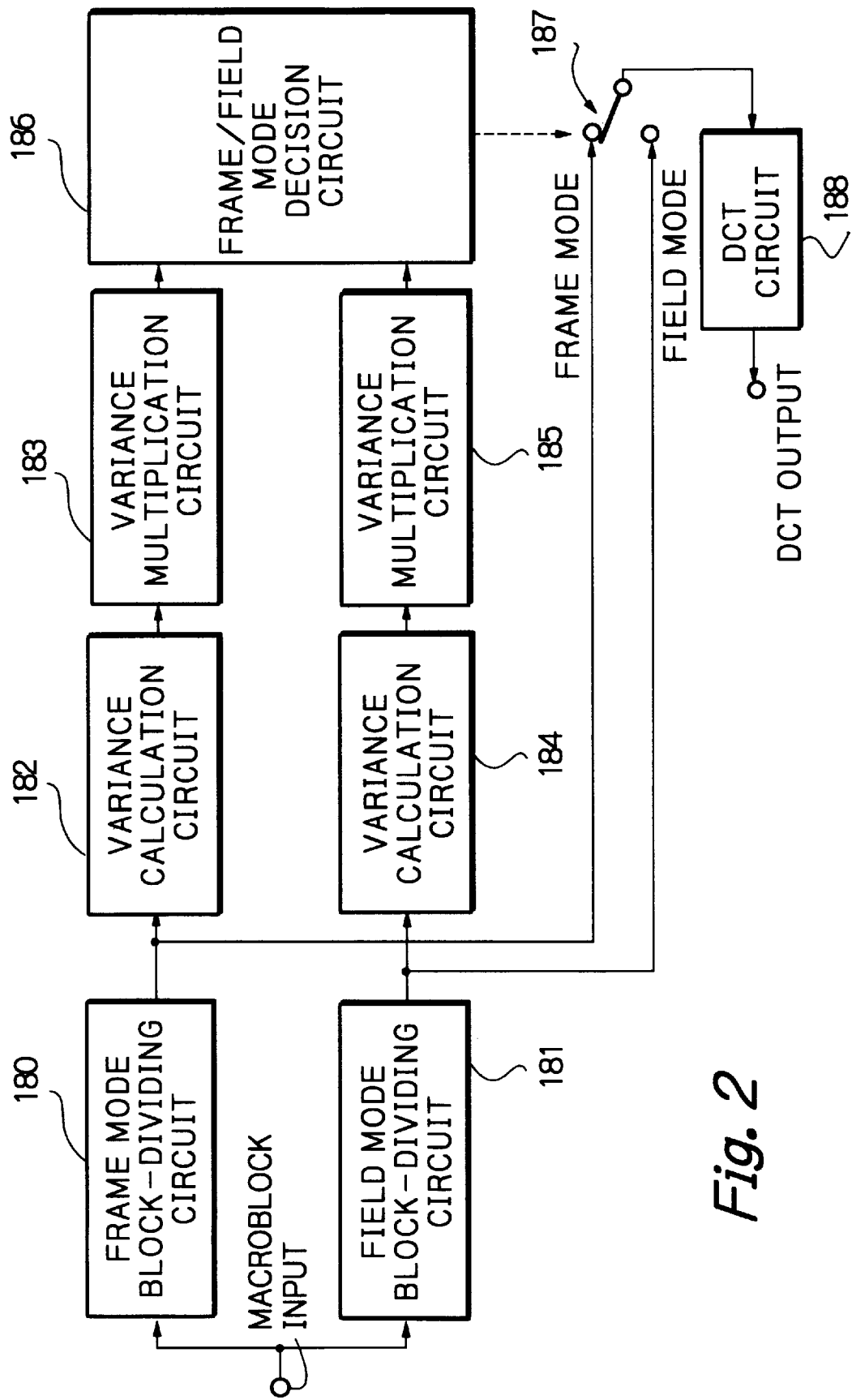
FIG. 2 is a schematic block diagram showing one configuration example of an optimum mode decision DCT unit of FIG. 1.

FIG. 2 schematically shows a configuration example of this optimum mode decision DCT unit 18. In FIG. 2, reference numerals 180 and 181 denote a frame mode block-dividing circuit and a field mode block-dividing circuit, respectively. The frame mode block-dividing circuit 180 is a circuit for simply dividing the input macroblock (16 pixels×16 lines) of a frame structure into four subblocks (8 pixels×8 lines) for the DCT processing. Whereas the field mode block-dividing circuit 181 is a circuit for dividing the inputted macroblock (16 pixels×16 lines) of a frame structure according to the even fields and the odd fields to obtain four subblocks (8 pixels×8 lines) by further dividing of each for the DCT processing.

Connected via a first variance calculation circuit 182 to the frame mode block-dividing circuit 180 is a first variance multiplication circuit 183, whereas a second variance multiplication circuit 185 is connected via a second variance calculation circuit 184 to the field mode block-dividing circuit 182. These first variance multiplication circuit 183 and second variance multiplication circuit 185 are connected to a frame/field mode decision circuit 186. The output terminal of the frame/field mode decision circuit 186 serves as a switching control signal of a switch 187 for selecting the output of the frame mode block-dividing circuit 180 and that of the field mode block-dividing circuit 181. The output terminal of the switch 187 is connected to a DCT circuit 188 for actually performing the orthogonal transform.

As shown in FIG. 3, the field-merged and input macroblock 30 with a frame structure is divided into four subblocks of the frame mode and four subblocks of the field mode at the frame mode block-dividing circuit 180 and the field mode block-dividing circuit 181, respectively. To be specific, in the frame mode block dividing, a macroblock is simply divided into four subblocks $31_{p1}$ to $31_{p4}$ of 8 pixels×8 lines for each. On the other hand, in the field mode block dividing, a macroblock is divided into the even fields 32 (16 pixels×8 lines) and the odd fields 33 (16 pixels×8 lines) and is further divided into four subblocks $34_{i1}$ to $34_{i4}$ of 8 pixels×8 pixels for each.

The first variance calculation circuit 182 calculates the variances $\sigma_{p1}$ to $\sigma_{p4}$ for the subblocks $31_{p1}$ to $31_{p4}$, respectively, and the first variance multiplication circuit 183 multiply these variances $\sigma_{p1}$ to $\sigma_{p4}$ with each other. On the other hand, the second variance calculation circuit 184 calculates the variances $\sigma_{i1}$ to $\sigma_{i4}$ for the subblocks $34_{i1}$ to $34_{i4}$, respectively, and the second variance multiplication circuit 185 multiply these variances $\sigma_{i1}$ to $\sigma_{i4}$ with each other. The multiplied results of the first variance multiplication circuit 183 and the second variance calculation circuit 184 $\sigma_{p1} \times \sigma_{p2} \times \sigma_{p3} \times \sigma_{p4}$ and $\sigma_{i1} \times \sigma_{i2} \times \sigma_{i3} \times \sigma_{i4}$ are input to the frame/field mode decision circuit 186.

The frame/field mode decision circuit 186 compares the input variance product $\sigma_{p1} \times \sigma_{p2} \times \sigma_{p3} \times \sigma_{p4}$ and variance product $\sigma_{i1} \times \sigma_{i2} \times \sigma_{i3} \times \sigma_{i4}$, and controls the switch 187 so as to select the mode of the smaller value. That is, if $\sigma_{p1} \times \sigma_{p2} \times \sigma_{p3} \times \sigma_{p4} < \sigma_{i1} \times \sigma_{i2} \times \sigma_{i3} \times \sigma_{i4}$, the frame mode is selected, or otherwise the field mode is selected. The subblocks selected like this are input to the DCT circuit 188 and subjected to the orthogonal transform.

Entropies of individual subblocks are proportional to logarithms of the respective variance values. That is, the entropies of the subblocks $31_{p1}, 31_{p2}, 31_{p3}$ and $31_{p4}$ are klog $\sigma_{p1}$, klog $\sigma_{p2}$, klog $\sigma_{p3}$ and klog $\sigma_{p4}$, respectively (k proportional constant). Thus, the entropy of the macroblock becomes klog $\sigma_{p1}$+klog $\sigma_{p2}$+klog$\sigma_{p3}$+klog$\sigma_{p4}$=klog($\sigma_{p1} \times \sigma_{p2} \times \sigma_{p3} \times \sigma_{p4}$) and can be considered by using the product of variances in four subblocks. As a result, if the mode of the smaller variance product is selected out of the frame mode and the field mode, the mode with the smaller entropy is selected, so that a more effective coding can be fulfilled.

As with this embodiment, by calculating the variance for each subblock in a macroblock, the local characteristics in the macroblock are so arranged as to be taken into consideration. Furthermore, variance of the macroblock is calculated from the calculated subblock variances since individual variances in the macroblock are substituted into a monotonously increasing and substantially saturating exponential function respectively to be summed, and a selection is decided in accordance with the evaluated sum, (i.e. selection is decided based on variance of the macroblock) an accurate decision can be expected without influence of an extremely large value in part if any.

In the embodiment mentioned above, an exponential function is employed to evaluate the sum of variances, but any monotonously increasing and substantially saturating nonlinear function, such as square root function or hyperbolic function, other than exponential function can be employed.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of deciding an optimum orthogonal transform mode before quantization in a motion picture coding system in which coding of interlaced TV signals proceeds in a frame structure and an orthogonal transform is made in the unit of a macroblock, comprising the steps of:

dividing said macroblock into a plurality of frame mode subblocks;

dividing said macroblock into a plurality of field mode subblocks;

calculating variances of the respective frame mode subblocks;

calculating variances of the respective field mode subblocks;

calculating a frame mode variance of said macroblock by calculating a sum of values of a monotonously increasing and substantially saturating nonlinear function using said calculated variances of frame mode subblocks as a variable;

calculating a field mode variance of said macroblock by calculating a sum of values of a monotonously increasing and substantially saturating nonlinear function using said calculated variances of field mode subblocks as a variable; and comparing said frame mode variance of said macroblock with said field mode variance of said macroblock to select one of the modes which is smaller in sum as the orthogonal transform mode.

2. The method as claimed in claim 1, wherein said nonlinear function is an exponential function.

3. The method as claimed in claim 1, wherein said nonlinear function is a square root function.

4. The method as claimed in claim 1, wherein said nonlinear function is a hyperbolic function.

5. The method as claimed in claim 1, wherein said orthogonal transform is discrete cosine transform.

6. An apparatus for deciding an optimum orthogonal transform mode before quantization in a motion picture coding system in which coding of interlaced TV signals proceeds in a frame structure and an orthogonal transform is made in the unit of a macroblock, comprising:

means for dividing said macroblock into a plurality of frame mode subblocks;

means for dividing said macroblock into a plurality of field mode subblocks;

means for calculating variances of the respective frame mode subblocks;

means for calculating variances of the respective field mode subblocks;

means for calculating a frame mode variance of said macroblock by calculating a sum of values of a monotonously increasing and substantially saturating nonlinear function using said calculated variances of frame mode subblocks as a variable;

means for calculating a field mode variance of said macroblock by calculating a sum of values of a monotonously increasing and substantially saturating nonlinear function using said calculated variances of said field mode subblocks as a variable; and means for comparing said frame mode variance of said macroblock with said field mode variance of said macroblock to select one of the modes which is smaller in sum as the orthogonal transform mode.

7. The apparatus as claimed in claim 6, wherein said nonlinear function is an exponential function.

8. The apparatus as claimed in claim 6, wherein said nonlinear function is a square root function.

9. The apparatus as claimed in claim 6, wherein said nonlinear function is a hyperbolic function.

10. The apparatus as claimed in claim 6, wherein said orthogonal transform is discrete cosine transform.

* * * * *